United States Patent
Fewox et al.

(10) Patent No.: US 11,391,853 B2
(45) Date of Patent: Jul. 19, 2022

(54) SYSTEM AND METHOD FOR EVALUATING ELUTION EFFICIENCY AND RADIOPURITY OF TC-99M GENERATORS

(71) Applicant: BWXT Isotope Technology Group, Inc., Lynchburg, VA (US)

(72) Inventors: Christopher Sean Fewox, Forest, VA (US); Bryan Blake Wiggins, Forest, VA (US); Stephen D. Preite, Charlotte, NC (US); Earl Brian Barger, Goode, VA (US)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 139 days.

(21) Appl. No.: 16/445,305

(22) Filed: Jun. 19, 2019

(65) Prior Publication Data

US 2019/0391284 A1  Dec. 26, 2019

Related U.S. Application Data

(60) Provisional application No. 62/687,612, filed on Jun. 20, 2018.

(51) Int. Cl.
*G01T 1/36* (2006.01)
*G01N 23/00* (2006.01)

(52) U.S. Cl.
CPC .......... *G01T 1/36* (2013.01); *G01N 23/00* (2013.01); *G01N 2223/626* (2013.01)

(58) Field of Classification Search
CPC .......... G01T 1/36; G01T 1/161; G01N 23/00; G01N 2223/626; G01G 1/0005; G01G 4/08; A61K 51/1282

(Continued)

(56) References Cited

U.S. PATENT DOCUMENTS 3,468,808 A   9/1969  Arino
6,603,127 B1 * 8/2003  Scheinberg .............. G21G 4/00
                                                            423/2

(Continued)

FOREIGN PATENT DOCUMENTS

GB         1207246 A      9/1970
WO     2018/057634 A1    3/2018

OTHER PUBLICATIONS

International Search Report and Written Opinion of corresponding International Application PCT/US2019/038107, dated Dec. 23, 2019, all enclosed pages cited.

(Continued)

*Primary Examiner* — David P Porta
*Assistant Examiner* — Fani Polyzos Boosalis
(74) *Attorney, Agent, or Firm* — Nelson Mullins Riley & Scarborough LLP

(57) ABSTRACT

A system for analyzing radiochemical purity of an eluate produced from a generator is provided. The system has an elution detector made of a shielding metal. The elution detector houses a flow path template for flow of an eluate solution and an elutable isotope contained in the generator, and a monitoring device for simultaneously monitoring the generator and the eluate exiting the generator. The generator is a Technetium-99m (Tc-99m) generator, and the elutable isotope may be contained in a packed bed of a column in the Tc-99m generator. A method for analyzing radiochemical purity of eluate produced from a Technetium-99m (Tc-99m) generator or column is also provided.

29 Claims, 3 Drawing Sheets

(58) Field of Classification Search
USPC .......................................................... 250/393
See application file for complete search history.

(56) References Cited

U.S. PATENT DOCUMENTS

| | | |
|---|---|---|
| 7,083,732 B1 | 8/2006 | Chollet et al. |
| 2007/0140958 A1 | 6/2007 | Dekemp |
| 2009/0191129 A1* | 7/2009 | Lehmann ................ C07B 59/00 424/9.44 |
| 2009/0309465 A1 | 12/2009 | Quirico et al. |
| 2012/0305789 A1 | 12/2012 | Kiselev et al. |
| 2015/0228368 A1 | 8/2015 | Lefort et al. |

OTHER PUBLICATIONS

Extended European Search Report, European Application No. 19825535.8, dated Feb. 28, 2022, 14 pages.

* cited by examiner

SYSTEM AND METHOD FOR EVALUATING ELUTION EFFICIENCY AND RADIOPURITY OF TC-99M GENERATORS

CROSS-REFERENCE TO RELATED APPLICATIONS

This application claims priority from U.S. Provisional Patent Application No. 62/687,612, filed on Jun. 20, 2018, in the United States Patent and Trademark Office. The disclosure of which is incorporated herein by reference in its entirety.

FIELD OF THE INVENTION

This invention generally relates to generators and systems and methods for evaluating elution efficiency and radiopurity, more particularly to a system and method for evaluating elution efficiency and radiopurity of Tc-99m generators via sequential volumetric gamma counting.

BACKGROUND OF THE INVENTION

Problems exist with known counting and radio quantification methods. Such problems include the need for handling high activity samples, and the need for waste removal of samples at the end of measurement and transport of "hot" radioactive material. The problem with handling radioactive materials is the inherent dose to the rad worker, which poses health risks.

High Pressure Liquid Chromatography (HPLC) techniques are often used. Disadvantages with such techniques include inherent problems that come with radioactive samples. For example, care needs to be taken to avoid many materials that lack radiation hardness. Tubing can degrade in the radioactive field and common columns used in HPLC cannot be used in high radiation fields due to concerns such as radiolysis.

Thus, there is a need for a system and method that overcomes these problems with existing methods.

SUMMARY OF THE INVENTION

In an embodiment of the invention, a system for analyzing radiochemical purity of an eluate produced from a generator is provided. The system comprises an elution detector comprised of a shielding metal. The elution detector houses a flow path template for flow of an eluate solution and an elutable isotope contained in the generator, and a monitoring device for simultaneously monitoring the generator and the eluate exiting the generator.

In an embodiment of the invention, a method for analyzing radiochemical purity of eluate produced from a generator is provided. The elution detector houses a flow path template and an elutable isotope contained in the generator. The method comprises providing an elution detector comprised of a shielding metal, eluting the generator containing the elutable isotope, and simultaneously monitoring the generator and eluate exiting the generator.

In an embodiment of the invention, the generator is a Technetium-99m (Tc-99m) generator.

In an embodiment of the invention, the elutable isotope is contained in a packed bed of a column in the Tc-99m generator.

In an embodiment of the invention, the elutable isotope is Mo-99.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

The present invention describes a method for quantifying radiochemical properties of eluates from a Technetium-99m (Tc-99m) generator. A volume of saline solution is incrementally (X mL at a time) passed through the eluting material. Saline intimately contacts the eluting material, and exits the column containing the desired Tc-99m along with other radioactive materials including Mo-99. Each sequential volume is measured for Tc and Mo content by gamma spectroscopy. The position of the gamma detectors can be varied to measure eluates real time during elution. The eluate is then passed through a filter column and again, counted by gamma spectroscopy in real time, measuring for contaminates. Additionally, a gamma detector is placed on the first eluting column to measure the removal or exchange of the Tc-99m. The final full volume of the eluate is collected and can be counted as normal.

Figure 1:
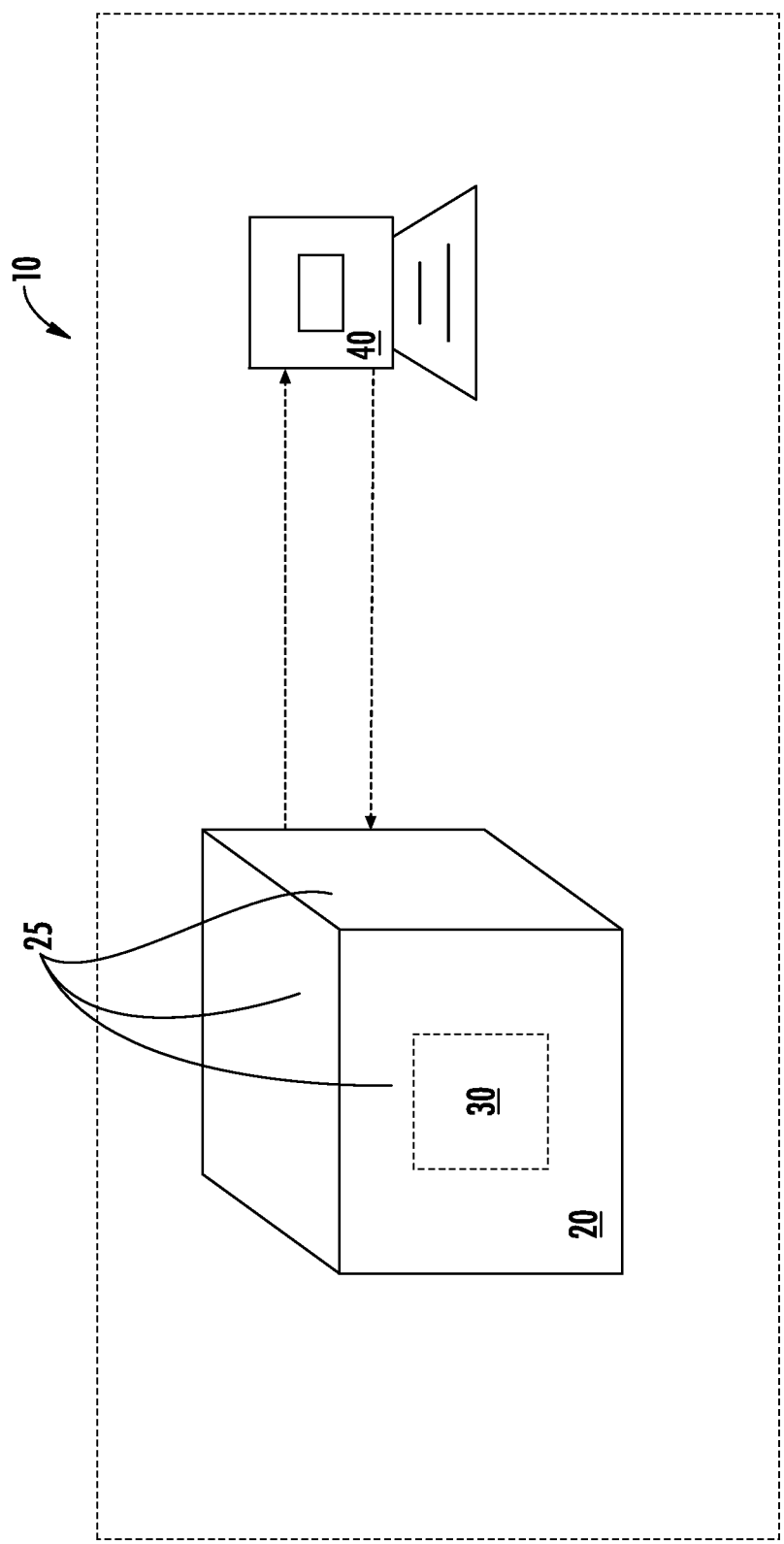
FIG. 1 is an illustration of an overall detection system for evaluating elution efficiency and radiopurity.

Referring to the figures, FIG. 1 is an illustration of an overall detection system 10 of the present invention. Among the purposes of detection system 10 of the present invention is to analyze radiochemical purity of eluates produced from a generator, preferably a Technetium-99m (Tc-99m) generator. Thus, detection system 10 comprises a shielded apparatus referred to as an elution detector 20 designed to enclose components of the system, including or excluding a virgin eluting solution. As shown in FIG. 1, detection system 10 comprises elution detector 20. Elution detector 20 is preferably comprised of a shielding metal. As shown in FIG. 1, elution detector 20 has shielding walls 25 that are comprised of the shielding metal. Elution detector 20 may be formed in any shape or be of any size. Preferably, the shielding metal is tungsten. However, other non-limiting examples of shielding metal include, but are not limited to, lead, steel, among others. The elution detector is communicatively connected to an output device 40. The connection may be, for example, a wireless connection or an electrical connection. Output device 40 displays or outputs data generated by the election detector 20. Non-limiting examples of data output by output device 40 are metrics and measurements such as elution efficiency, elution efficiency over time, actual radioactive activity of a column at time zero, etc.

Figure 2:
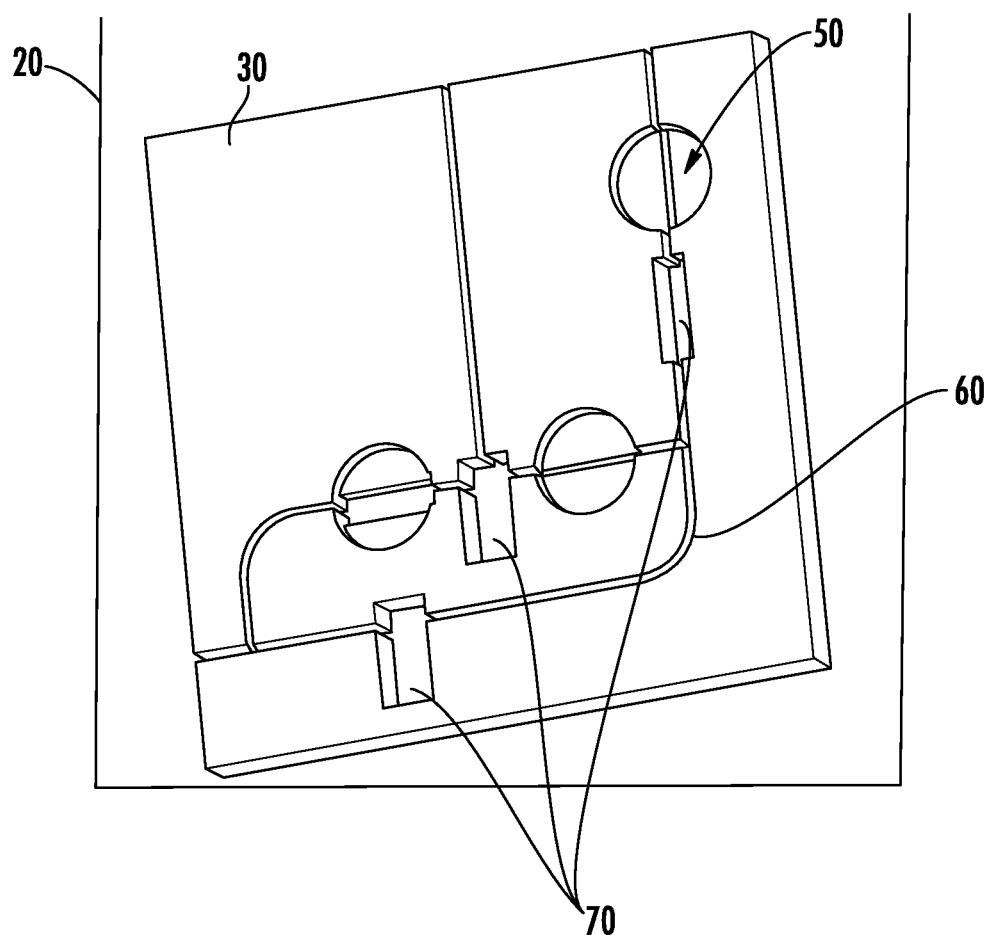
FIG. 2 is an illustration of a flow path template of the detection system of FIG. 1.

FIG. 2 is an illustration of a flow path template 30 of elution detector 20 of detection system 10 of FIG. 1. Elution detector 20 houses a flow path template 30. Preferably, flow path template 30 is comprised of a shielding metal. Preferably, the shielding metal is tungsten. However, other non-limiting examples of shielding metal include, but are not limited to, lead, steel, among others.

As discussed herein, flow path template 30 is a portion of the detection system. Flow path template 30 as shown has detector positions 50 which are represented by circular cutouts. Flow path template 30 may also have channels and/or tubing 60. Flow path template 30 may comprise one or more components 70 such as eluates, filters, reservoirs, or a combination thereof that are represented in FIG. 2 as rectangular cut outs. Flow path template 30 has unique geometry and provides a more compact design, better detector geometry stability, and better deployment in a "hot cell." The geometry of flow path template 30 and components 70 therein may be varied and be within the scope of the present invention.

Various components 70 are inserted in flow path template 30. An example of a component is a refillable vessel containing a virgin eluting solution. A device 120 may be a vessel or column containing a packed bed and/or a filter media. Such vessels are easily interchangeable once a measurement is completed. Another example of a component is a pump. A pump may be present to allow for control of flow through the apparatus. In order to automate measurement in detector system 10, components such as gamma detectors, embedded flow detectors including, but not limited to, capacitance and/or conductivity monitors may be present. One or more embedded flow detectors are preferably strategically placed to monitor the packed bed, the exiting eluate before entering the filter media, the eluate after exiting the filtering media, or a combination thereof. The flow path of flow path template 30 has a limited dead volume (void space).

Figure 3:
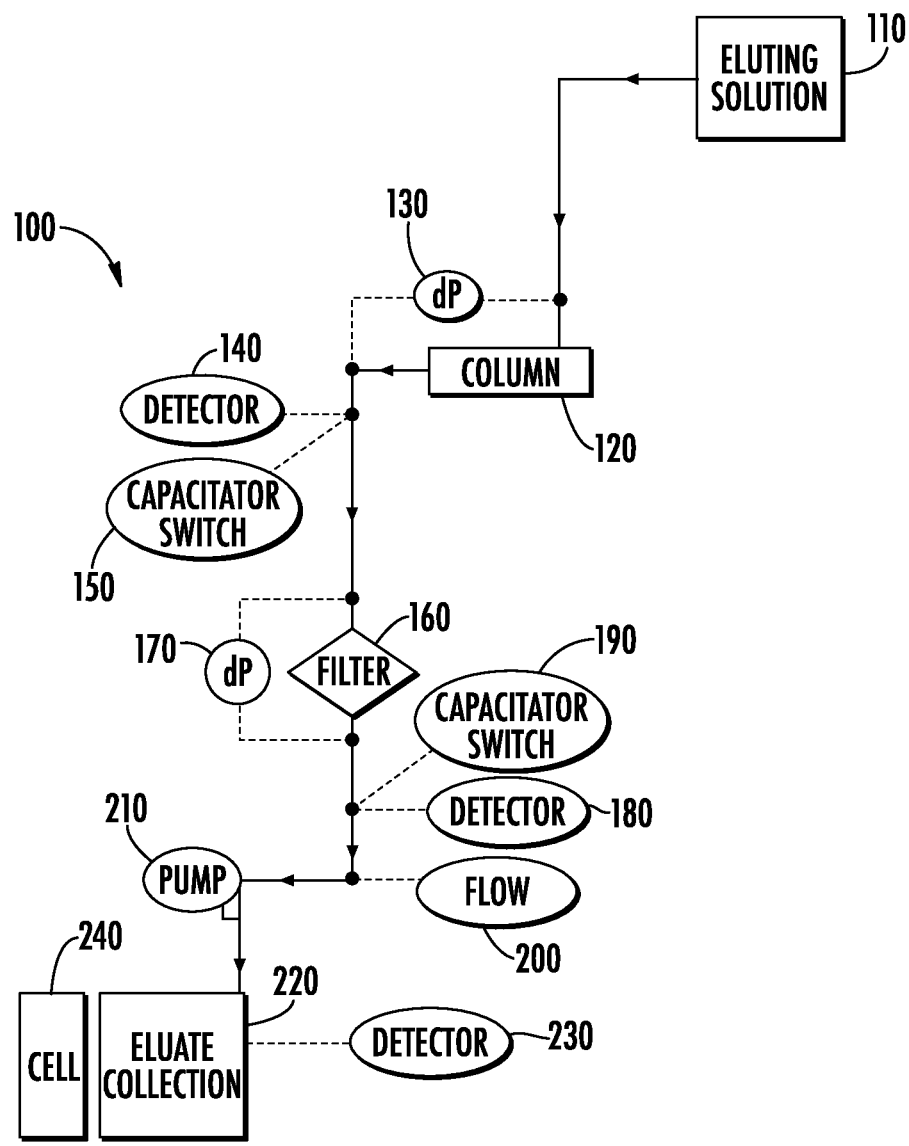
FIG. 3 is an illustration of a flow path process diagram for use with a flow path template of FIG. 2.

FIG. 3 is an illustration of a flow path process diagram 100 for flow of eluting solution in flow path template 30 of FIG. 2. As shown in FIG. 3, a volume of eluting solution 110 composed of saline, deionized water, and/or other aqueous or non-aqueous liquid, is passed through device 120 such as a column having a packed bed, or slurry containing Tc-99m and/or other radioactive species of interest including, but not limited to, Mo-99. A ratio of the volume of eluting solution 110 to the mass of the packed bed may be varied, but is optimally 100 milliliters (mL). Measurement instrument 130 measures pressure across an inlet and an outlet of device 120. Eluting solution 110 and the packed bed contain Tc-99m and/or other radioactive chemical species that decay and emit detectable particles or photons. The flow path is strategically monitored. Detectors 140 and/or capacitance switch(es) 150 determining the concentration of radio species of interest are placed next to device 120 which may be a column, the exit of the column, filter column and/or the exit of the filter column. As the solution exits the packed bed (referred to as eluate), a coincidence between detector 140 and a syringe trigger of a pump 210 will trigger an automated counting and detection sequence.

Whenever flow starts from the pump, an electronic output is produced. This trigger gets used in coincidence (using an AND gate) with the detected signal from the eluate to reduce background noise of the detector. In order to pull the eluate through the columns, a source of vacuum is used.

The solution is being pulled or pushed through the system via a pump with a known flow rate controlled by the pump. The pump could be located as shown in FIG. 3 to pull (i.e. vacuum) solution through the system or could be relocated to the start of the system to push. Differential pressure (dP) sensors are located across flow path components (i.e. columns and filters) to collect general component performance data. The detectors and capacitance sensors are used in conjunction with one another. The detectors are collecting the actual isotope/activity data. The capacitance switch provides an indication when the solution has arrived at the sensor and when the detection signal is valid for monitoring. Since elution performance of the columns may vary and the filter can impact the eluate, there may be multiple locations throughout the system where detector/capacitance sensors are placed to characterize the eluate as it passes through the system. While not necessarily required, the load cell placed at the end of the system is another method for monitoring the rate of flow over time and to measure the final collection volume of the eluate versus the total eluting solution introduced to the system. It could also be used to identify when the process is complete and the final detector count should be triggered.

As shown in FIG. 3, the eluate may pass through a filter 160. Measurement instrument 170 measures pressure across an inlet and an outlet of filter 160. The eluate passes through a detector 180 and capacitance switch 190. A flow meter 200 measures eluate flow rate. The eluate then passes through pump 210 and to eluate collection 220 which is communication with detector 230. Eluate collection can collect everything through the entire detector system, and a final full volume of the eluate to be counted is collected in cell 240.

As eluting solution 110 passes through each detector position, quantities of Tc-99m, Mo-99, and other radio isotopes are automatically detected and quantified providing the following measurements and metrics: packed bed activity, eluate radio composition prior to filtering, eluate radio composition after filtering, filtering efficiency, elution efficiency of the eluate, among others.

The shielding can be made from various metals and materials such as steel, tungsten, lead, or others. The shielding is uniquely designed in a hinged manner with the elution path machined to tight tolerances such that the detector geometry does not change. The packed bed and/or filter column can be removed with remote manipulators and replaced with fresh material to be analyzed. The eluting solution can also be remotely placed on the exterior of the shielding material.

Detectors 140, 180, 230 can be comprised of NaI(Tl) or Germanium crystals and may analyze for single or multichannel signals. NaI and Ge are particularly suitable for use of detectors for low to mid activities. Gas proportional and gas ionization detectors may be used for high activities. A gas proportional counter, gas ionization detector, or other suitable gas based detector can be utilized so long as electronic pileup is reduced in its implementation. Depending upon the activity of the column, detection system 10 will be optimized. For example, for low-mid activities a gas-proportional counter, NaI(Tl) phototube, or Ge detector will be used. For high activities, either a scintillation doped microchannel plate detector or pixelated LaBr3:Ce Si-APD based system will be utilized.

There are numerous advantages associated with the method of the present invention. The method of the present invention solves previous problems found in other counting and radio quantification methods. A non-exhaustive list of such advantages of the system and method of the present invention are: eliminating the need for handling high activity samples for multiple elution and filtering steps; allowing for simultaneous quantification of column activity and eluate activity in real time; allowing for efficient batch testing of eluates for both the pre-filter and post-filter; allowing for efficient optimization of Tc-99m specific activity vs elution volume study to characterize generators; operating remotely inside or outside of a "hot cell" or other containment device without further shielding requirements; eliminating the need for removal of and transport "hot" material; allowing for study of how varying pressure on inlet affects elution efficiency; controlling flow rate of eluate for systematic measurement; and HPLC techniques are not required, among other advantages.

Components of the detection system may be varied and are still within the scope of the present invention including, but not limited to, an array of detectors surrounding the packed bed. With such a system, inhomogeneities in the powder and channeling can be investigated. Such a system would most likely involve a pixelated LaBr3:Ce Si-APD based system. Detectors can be modified to count Beta emitters and/or Alpha emitters and not just Tc.

In an embodiment of the present invention, a method for analyzing radiochemical purity of eluates produced from a Technetium-99m (Tc-99m) generator is provided. The method comprises continuously eluting a packed bed of a column containing an elutable isotope and simultaneously monitoring the packed bed and eluate as the eluate exits the column. The method comprises continuously eluting a packed bed of a column containing an elutable isotope and simultaneously monitoring the eluate as the eluate exits a filter media. The method may comprise simultaneously monitoring all of the above while monitoring flow rate through the apparatus.

In an embodiment of the present invention, the detection system, flow path template, and method can be used for other uses including, but not limited to, quality assurance and/or quality control, eluate solutions, and/or for chemical separation.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A system for analyzing radiochemical purity of an eluate produced from a generator, the system comprising:
an elution detector comprised of a shielding metal, wherein the elution detector houses a flow path template for flow of an eluate solution and an elutable isotope contained in the generator, and
a monitoring device for simultaneously monitoring the generator and the eluate exiting the generator.

2. The system according to claim 1, wherein the generator is a Technetium-99m (Tc-99m) generator.

3. The system according to claim 2, wherein the elutable isotope is contained in a packed bed of a column in the Tc-99m generator.

4. The system according to claim 3, wherein the monitoring device monitors the packed bed of the column.

5. The system according to claim 1, wherein the elutable isotope is contained in a slurry containing Tc-99m, another radioactive species, or both.

6. The system according to claim 1, wherein the flow path template comprises a component selected from the group consisting of an eluate, filter, reservoir, a refillable vessel containing a virgin eluting solution, a pump, an embedded flow detector, a gamma detector, and a combination thereof.

7. The system according to claim 1, wherein the elution detector has shielding walls.

8. The system according to claim 7, wherein the shielding walls are comprised of the shielding metal.

9. The system according to claim 1, wherein the shielding metal is selected from the group consisting of tungsten, lead, steel, and a combination thereof.

10. The system according to claim 1, wherein the elution detector is communicatively connected to an output device.

11. The system according to claim 1, wherein the flow path template is comprised of a metal selected from the group consisting of tungsten, lead, steel, and a combination thereof.

12. The system according to claim 1, wherein the flow path template has a detector position.

13. The system according to claim 1, wherein the elutable isotope is Mo-99.

14. A system for analyzing radiochemical purity of an eluate produced from a generator, the system comprising:
an elution detector comprised of a shielding metal, wherein the elution detector houses a flow path template for flow of an eluate solution and an elutable isotope contained in the generator, and
a monitoring device for simultaneously monitoring the generator and the eluate exiting the generator, and
wherein the flow path template comprises a component selected from the group consisting of an eluate, filter, reservoir, a refillable vessel containing a virgin eluting solution, a pump, an embedded flow detector, a gamma detector, and a combination thereof, and
wherein the embedded flow detector is placed to monitor a packed bed, an eluate before or after entering a filter media, and a combination thereof.

15. A method for analyzing radiochemical purity of eluate produced from a generator, the method comprising:
providing an elution detector comprised of a shielding metal, wherein the elution detector houses a flow path template and an elutable isotope contained in the generator,
eluting the generator containing the elutable isotope, and simultaneously monitoring the generator and eluate exiting the generator.

16. The method according to claim 15, wherein the generator is a Technetium-99m (Tc-99m) generator.

17. The method according to claim 16, wherein the elutable isotope is contained in a packed bed of a column in the Tc-99m generator.

18. The method according to claim 15, wherein the flow path template comprises a component selected from the group consisting of an eluate, filter, reservoir, a refillable vessel containing a virgin eluting solution, a pump, an embedded flow detector, a gamma detector, and a combination thereof.

19. The method according to claim 18, wherein the gamma detector is used for measurement of the eluate in real time.

20. The method according to claim 18, further comprising placing the gamma detector on a first eluting column to measure removal or exchange of Tc-99m.

21. The method according to claim 15, wherein eluting occurs with a volume of eluting solution.

22. The method according to claim 21, wherein the volume of eluting solution is saline, deionized water, another aqueous liquid, a non-aqueous liquid, or a combination thereof.

23. The method according to claim 21, wherein the volume of eluting solution is incrementally passed through the packed bed of the column in the Tc-99m generator.

24. The method according to claim 23, further comprising measuring the incremental volume for Tc and Mo content by gamma spectroscopy.

25. The method according to claim 15, further comprising passing the eluate through a filter column one or more times.

26. The method according to claim 15, further comprising counting by gamma spectroscopy in real time.

27. The method according to claim 15, further comprising measuring for contaminates.

28. The method according to claim 15, further comprising collecting a final full volume of the eluate to be counted.

29. The method according to claim 15, wherein the elutable isotope is Mo-99.

* * * * *